UNITED STATES PATENT OFFICE.

HEINRICH HEMPEL, OF BERLIN, GERMANY.

PROCESS OF PRODUCING LUMINOUS SPIRITS.

SPECIFICATION forming part of Letters Patent No. 621,411, dated March 21, 1899.

Application filed April 12, 1897. Serial No. 631,864. (No specimens.)

*To all whom it may concern:*

Be it known that I, HEINRICH HEMPEL, engineer, a citizen of Prussia, Germany, residing at No. 4 Waterloo Ufer, Berlin, Germany, have invented a certain new and useful Improved Process of Producing Luminous Spirits, of which the following is a full, clear, and exact description, and for which I have obtained a patent in England, dated March 11, 1897, No. 6,463.

The object of the present invention is to render alcohol luminous when burned. In order to attain this object, it is necessary to add volatile oils rich in carbon to the alcohol, such oils being advantageously employed as possess little or no oxygen, such as naphthalene. Hydrocarbons capable of being entirely dissolved in alcohol may also be employed.

In order to avoid certain disadvantages, too much of the liquid rich in carbon employed, such as naphthalene, should not be added, while, on the other hand, if too little is added the illuminating power of the mixture will not be sufficient, and therefore in order to meet both requirements the amount of carbon contained in the liquid hydrocarbon is increased by the process hereinafter described.

In order to carry out the present process, solid hydrocarbons very rich in carbon are advantageously employed—such, for instance, as naphthalene. One part, by weight, of naphthalene is heated in a suitable receptacle with from three to six parts, by weight, of turpentine (any kind of oil of turpentine may be employed) until the whole of the naphthalene is dissolved, the mixture being stirred or agitated. It is then distilled in a still at about 160° to 180° centigrade, said still being connected in suitable manner with a condenser until a slight residue of a brownish color has been deposited and begins to develop fumes. If cooled, the residue will take the form of a hard mass. In distilling, the compound should be sharply boiled in order that the vapors of turpentine-oil may carry off with them the naphthalene-vapors. Otherwise if the distillation is slow and conducted at a comparatively low temperature the more volatile oil of turpentine will pass off alone into the condenser, while the naphthalene will vaporize very slowly and will partially bake onto the bottom of the still in the form of a dark-brown mass. After the distillation has taken place the contents of the condenser are heated to boiling-point and stirred and then added to the alcohol in the proportion of one part, by weight, of the product of distillation to two to six parts, by weight, of alcohol, according to the degree or quality of the latter. The mixture should then be again stirred and the illuminating fluid, which is now as clear as water, is ready for use. Any alcohol of from eighty-five to one hundred degrees may be employed.

The heating of the contents of the condenser previous to mixing the product of distillation with the alcohol facilitates the combination of the fluid and alcohol when mixed.

If glycerin to the extent of from five to ten per cent. of the oil of turpentine originally taken is added, the mixture will be rendered softer and more oily, so that the wick of a lamp fed or filled with this liquid may be easily ignited even when the lamp has been out of use for some considerable time.

I claim as my invention—

A process for producing means for enriching alcohol with carbon, which consists in dissolving one part by weight of a hydrocarbon rich in carbon, such as naphthalene in from three to six parts by weight of oil of turpentine, agitating the mixture and distilling at the temperature specified, heating the product to boiling-point and stirring the same and finally adding to alcohol substantially as described.

In testimony whereof I have signed my name to this specification in the presence of two subscribing witnesses.

HEINRICH HEMPEL.

Witnesses:
HENRY HASPER,
W. HAUPT.